United States Patent [19]
Previero

[11] Patent Number: 6,149,807
[45] Date of Patent: Nov. 21, 2000

[54] SELF-LOCKING FILTER-SCREEN FEEDING DEVICE

[75] Inventor: Flavio Previero, Albese con Cassano, Italy

[73] Assignee: Previero N. S.r.l., Alzate Brianza, Italy

[21] Appl. No.: 09/359,889

[22] Filed: Jul. 26, 1999

[30] Foreign Application Priority Data

Jul. 24, 1998 [IT] Italy .................................. MI98A1709

[51] Int. Cl.$^7$ .................................................. B01D 29/96
[52] U.S. Cl. ........................... 210/236; 210/387; 210/401
[58] Field of Search ................................... 210/236, 386, 210/387, 400, 401

[56] References Cited

U.S. PATENT DOCUMENTS

| | | | |
|---|---|---|---|
| 3,471,017 | 10/1969 | Kalman | 210/387 |
| 3,855,126 | 12/1974 | Smith | 210/388 |
| 3,940,335 | 2/1976 | Kalman | 210/387 |
| 3,971,721 | 7/1976 | Fogarty, Jr. | 210/401 |
| 4,842,750 | 6/1989 | Britchi | 210/387 |
| 4,888,110 | 12/1989 | Fogarty, Jr. | 210/387 |
| 5,320,753 | 6/1994 | Keillor, III et al. | 210/401 |
| 5,417,866 | 5/1995 | Trott | 210/236 |
| 5,556,592 | 9/1996 | Hitchings | 210/387 |

*Primary Examiner*—Christopher Upton
*Attorney, Agent, or Firm*—Young & Thompson

[57] ABSTRACT

A self-locking filter-screen feeding device for plastic material; the device comprises a carriage which may be reciprocated on guide rods parallelly extending to a filter band movable across a flow-path for the plastic material to be filtered in a filter apparatus. The carriage is provided with a resting surface for the filter band and pressure members, angularly rotatable operatively connected to actuators for selectively engaging and urging the filter band against the resting surface and for reciprocating the carriage along the guide rods.

7 Claims, 5 Drawing Sheets

SELF-LOCKING FILTER-SCREEN FEEDING DEVICE

BACKGROUND OF THE INVENTION

The present invention relates to a screen feeding device for a filter apparatus of the type comprising a flow-path for a flowable plastic material to be filtered, in which a continuous filter screen is transversally movable to the flow-path of the plastic material and drawn for periodically advancing the filter screen to substitute a clogged area of the filter with a clean one in said flow-path.

RELATED PRIOR ART

In recovery plants which involve the filtration of a plastic material in a molten state, it is known to remove unwanted particulate materials by the use of a filter device capable of providing homogeneity and purity of the processed plastic material outcoming from the filter device.

Filter devices therefore have been suggested which make use of a filter screen in the form of a strip or band, usually formed by a continuous screen member having very small mesh, which is periodically advanced each time a filter area of the screen become soiled and tend to clog, to be replaced with a clean one, reducing to a minimum and possibly eliminating intervention by any operator and the down time of the plant.

In order to do this, availability of a screen feeding device is required which periodically and in combination with an appropriate screen clamping device, is capable to step feeding the screen for a length corresponding to or grater than the extension of the soiled area. Filter devices of this type, are described for example in U.S. Pat. No. 3,971,721 and U.S. Pat. No. 4,842,750.

More precisely U.S. Pat. No. 3,971,721 describes a continuous filter device in which a screen or a continuous filter strip is advanced through a guide channel of a predeterminate cross-sectional size, and carries a plurality of seal members spaced apart along its length to form moving seals. The filter strip is continuously or periodically moved, across the flow-path of the molten plastic material, by an endless draw device having protruding arms to engage the sealing members at the outlet side of the filter strip from the filter device.

Although this type of feeding device theoretically performs an advancement of the filter strip at a constant step, practically the proposed solution suffers of many disadvantages in that solidified plastic material remain in the space between two adjacent seal members, on the outlet side of the screen, preventing or making difficult the engagement with the arms of the endless draw device. Furthermore, a costly and special net screen is required to seal the flow-path for the molten plastics.

Conversely, U.S. Pat. No. 4,842,750 suggests the use of a special filter device comprising axially movable tubular portions defining a path for the molten plastic material, to enlarge the volume upstream a strip-shaped screen, to reduce pressure, avoiding synthetic material from escaping when the filter screen is advanced to substitute a clogged area with a clean one.

According to a first embodiment, the screen strip is advanced by a drive connected to a drum from which the screen is unwound or respectively is wound up.

The proposed solution in U.S. Pat. No. 4,842,750, besides requiring a filter device of special design, does not assure feeding of the screen at a constant step in that the screen portion outcoming the filter device is clogged by solidified plastic material which prevent or make difficult the advancement of the strip or its winding up on a drum. Furthermore, this solution is costly and of complex design, requiring special signal generators or encoders and an electrical circuit to control the feeding step at each advancement of the screen. Lastly, the use of pressure-jaws to immobilise the screen delay any screen change.

OBJECTS OF THE INVENTION

An object of the present invention is therefore to provide a feeding device for a continuous filter screen in a filter apparatus for plastic material, which is of simple design and allows for an accurate advancement of the filter screen, at each change.

Another object of the invention is to provide a self-locking feeding device for a filter screen as stated above, in which any reaction to the advancement by the screen or filter member, will tend to increase the drawing force exerted on the same screen by the feeding device.

Another object of the present invention is to provide a feeding device for the net screen of a filter apparatus, in which the step feeding is simply controlled mechanically during each change.

BRIEF DESCRIPTION OF THE INVENTION

In accordance with the invention, a screen feeding device is provided for a filter apparatus of the type comprising a flow-path for a flowable plastic material to be filtered by a screen in the form of a filter band transversely movable to the flow-path, and draw means for periodically advancing the filter band to substitute a clogged area with a clean one in said flow-path, the feeding device comprising:

a carriage movable along guide members parallely extending on a side of the filter band;

surface means on the carriage for resting or supporting the filter band;

at least one rotatable pressure member fastened to a shaft on the carriage, for engaging and pressing the filter band against said surface means; and drive means operatively connected to the pressure member and to the carriage, to sequentially rotate the same pressure member and to reciprocate the carriage for selectively engaging and disengaging the filter band, and move the carriage along the guide members between a retracted and an advanced position to draw the filter band across said flow-path.

BRIEF DESCRIPTION OF THE DRAWINGS

These and further objects and advantages of the invention, will appear from the description of some preferred embodiments thereof, with reference to the drawings in which.

DETAILED DESCRIPTION OF THE INVENTION

Figure 1:
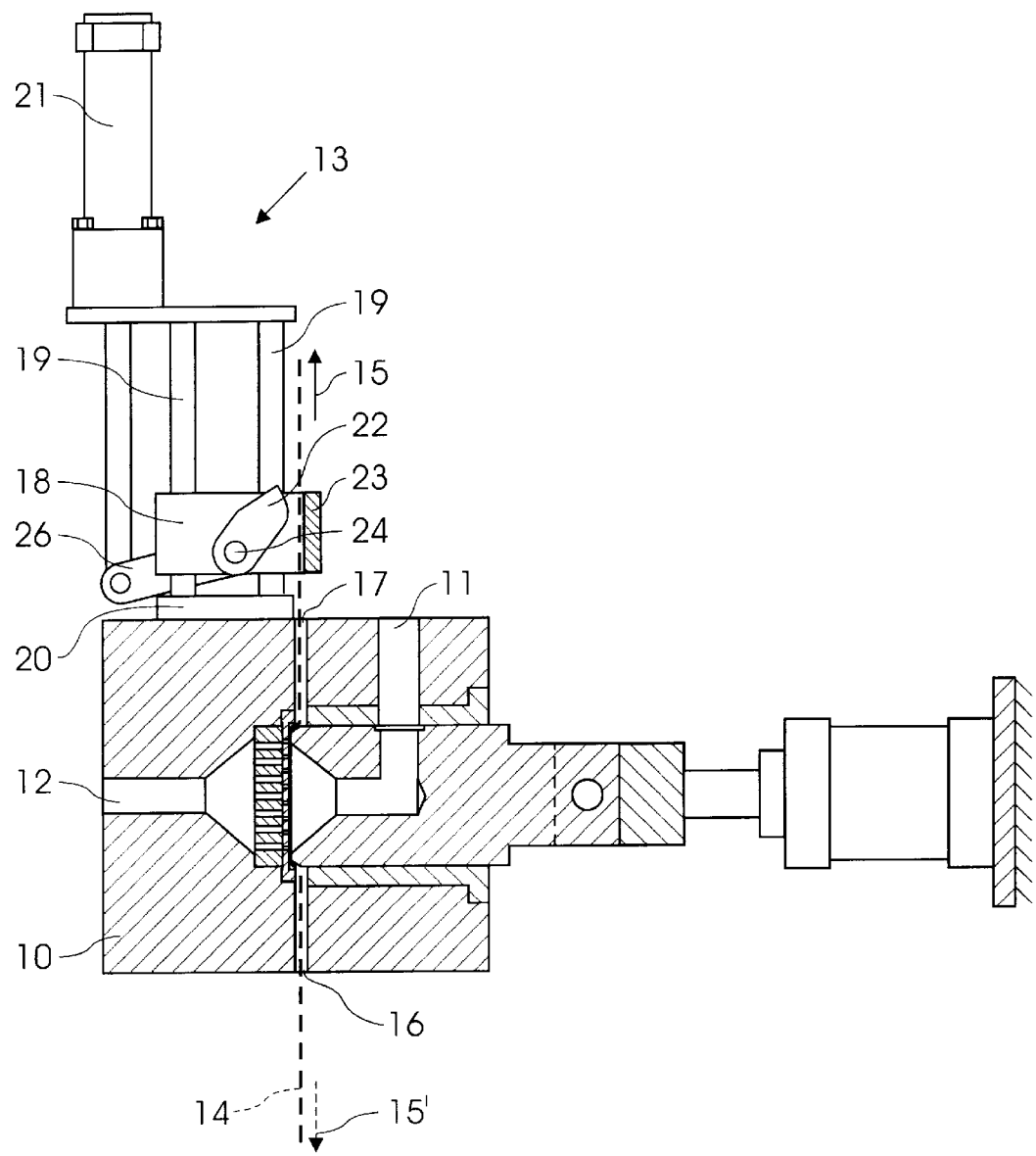
FIG. 1 schematically shows a filter apparatus provided with a screen feeding device according to the invention.

In FIG. 1, reference 10 indicates the body of a filter apparatus for flowable plastic material of any suitable type, comprising a flow-path extending between an inlet 11 and an outlet 12 as shown; in the same figure, reference number 13 indicates a screen feeding device for drawing a filter screen 14 in the form of a continuous filter band, to step advance the same in the sense of arrow 15 inside a filter chamber and across the flow-path 11, 12 for the molten plastic material, between an inlet 16 and an outlet side 17 for the same filter band 14.

Figure 2:
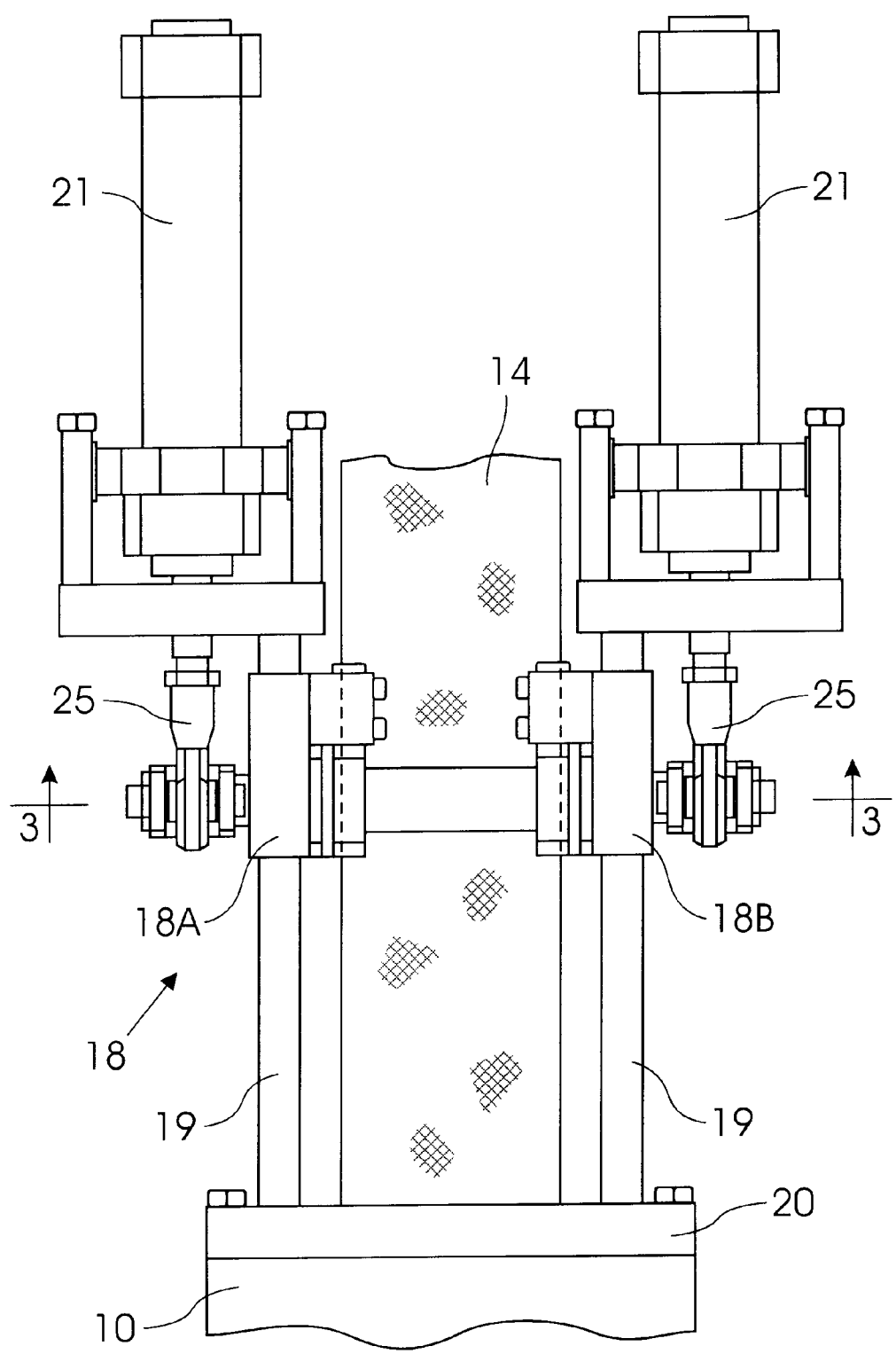
FIG. 2 is a side view of the screen feeding device of FIG. 1.
Figure 3:
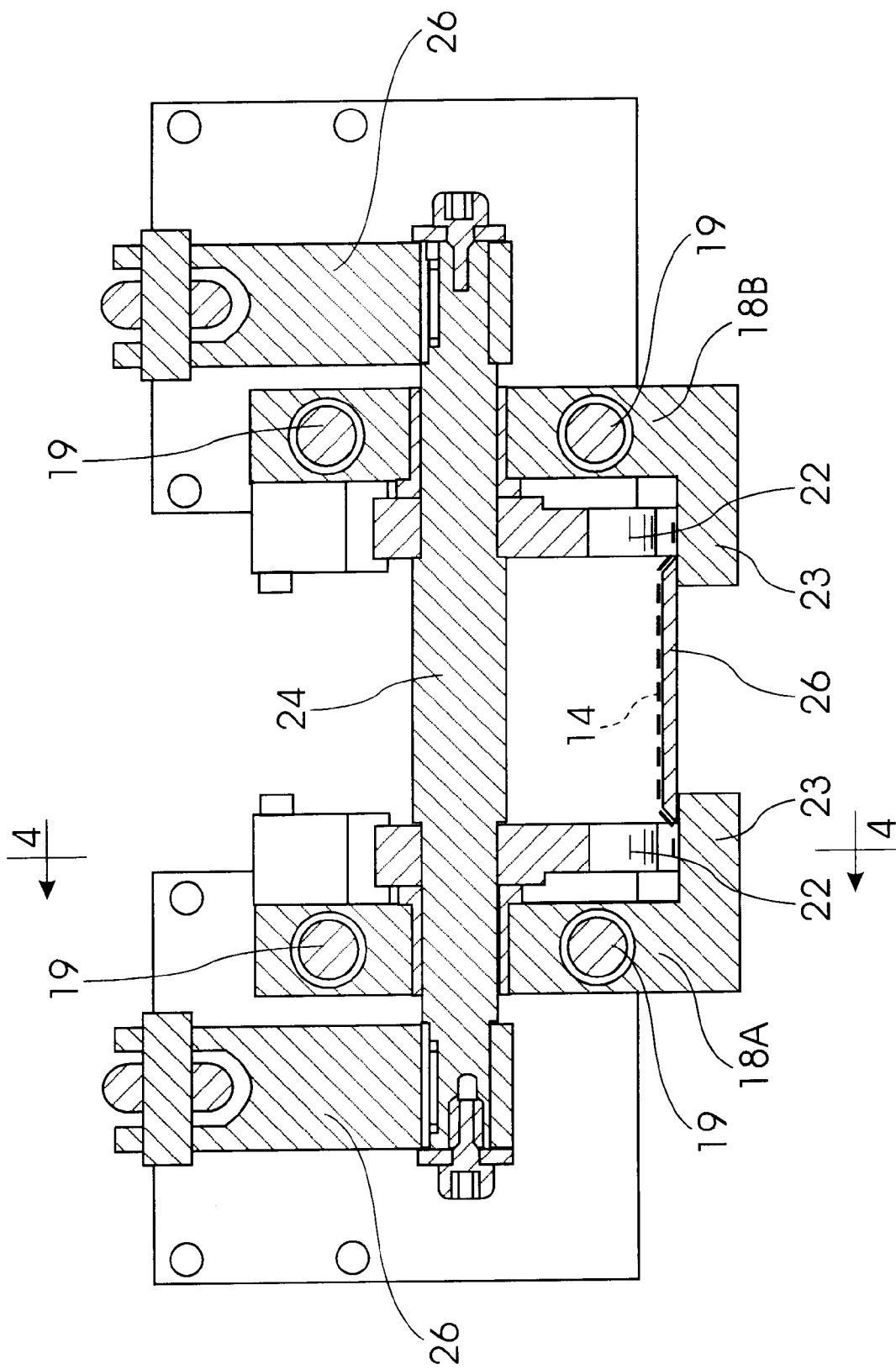
FIG. 3 is a cross-sectional view according to line 3—3 of FIG. 2.

According to an embodiment of the present invention, shown in FIG. 1 to 3, the feeding device 13 comprising a carriage 18 which may be reciprocated along guide members, for example in the form of rails or guide rods 19, which extend from a base plate 20 fastened to the body 10 of the filter device, on one side and parallely to the filter band 14.

Figure 4:
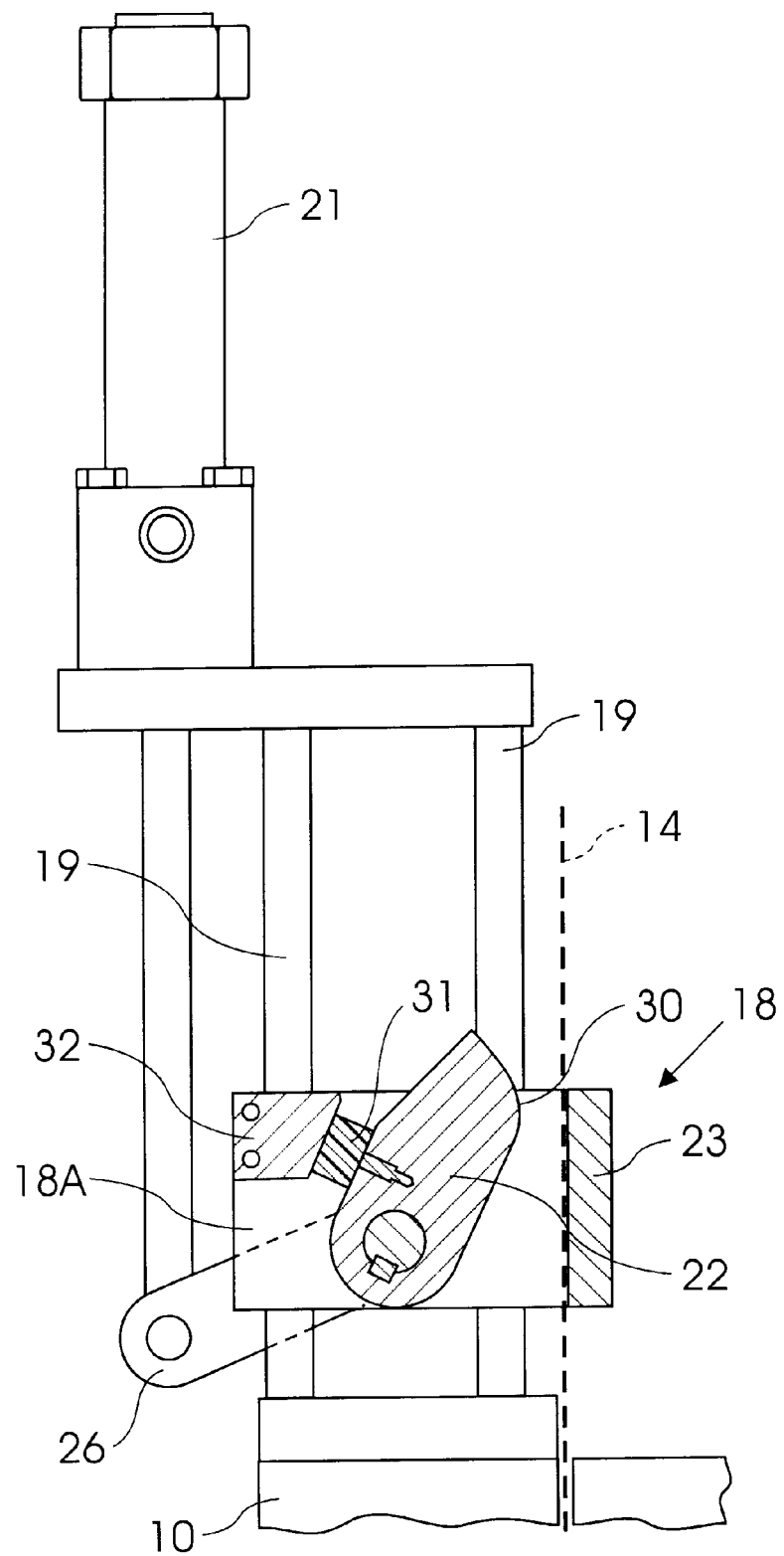
FIG. 4 is a view according to line 4—4 of FIG. 3 of the screen feeding device, in the retracted inoperative condition.
Figure 5:
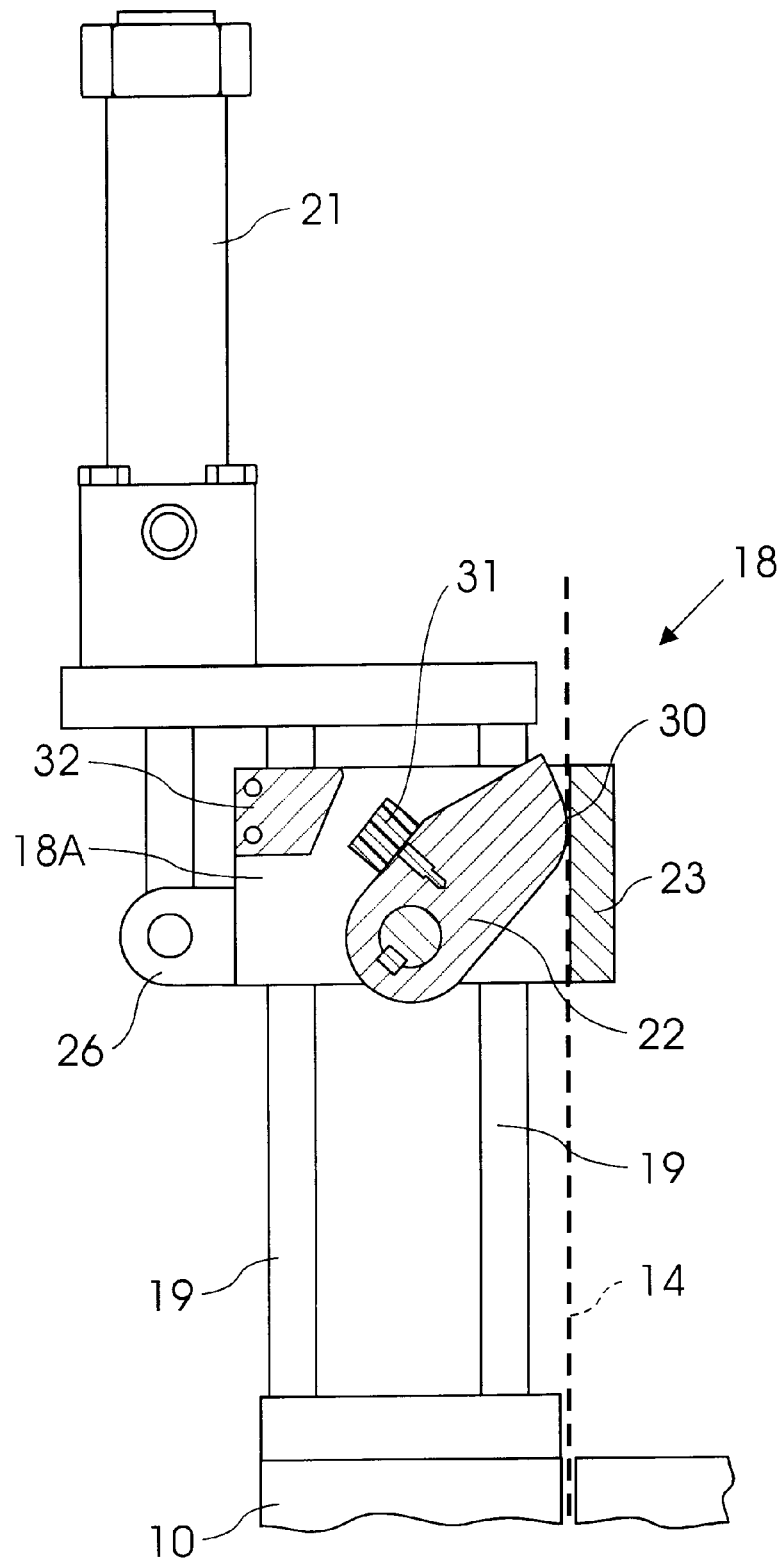
FIG. 5 is a view according to line 4—4 of FIG. 3 of the feeding device, in the advanced operative condition.

Drive means 21 in the form of linear actuators, for example two pressure actuated cylinders or any other suitable actuator devices, are provided to selectively reciprocate the carriage 18 along the guide rods 19, and angularly rotate one or more pressure members 22, to urge and lock the filter band 14 against surface means 23 for supporting and drawing forwards the filter band 14 during each reciprocation of the carriage 18, from the retracted position of FIGS. 1, 2 and 4, to the advanced position of FIG. 5.

As shown in FIGS. 3, 4 and 5, the pressure member or each pressure member 22 is supported by a shaft 24 to be angularly rotated to and from the resting surface 23, operatively in a direction opposite to the advancement direction 15 for the filter band 14; as will be explained further with reference to the FIGS. 4 and 5, the reverse rotation and slanted disposition of the pressure member 22 will result in a self-locking action of the same pressure member 22 which will be backwards rotated at any reaction of the filter band 14, to press and lock the filter band 14 against the resting surface 23, preventing any slippage.

For the purpose of the present invention, the carriage 18 and the resting surface 23 for the filter band 14, and the pressure member or members 22, may be of any other constructional type, in respect to what shown, comprising a slider movable on side rails; for example the carriage 18 may be of a single piece or of two or more pieces joined each other.

According to the embodiment of FIGS. 2 to 5, the carriage 18 comprises two carriage members 18A and 18B, slidably supported by respective guide rods 19.

Each carriage member 18A and 18B is provided with a pressure member 22 running along a longitudinal edge of the filter band 14, in correspondence of a respective resting surface 23 provided by a shoulder or wall member inwardly protruding; a plate 26 is bridging the shoulders 23 to better support the filter band 14, and to connect both carriage members 18A and 18B.

The two carriage members 18A and 18B are conjointly reciprocated by respective actuators 21 having the piston rod 25 linked by a crank arm 26 to the shaft 24 rotatably supported and transversely extending between the two carriage members 18A and 18B.

From the figures, it will be noted that each actuator 21 is supported at the end of the guide rods 19 which is opposite to the filter device 10; nevertheless any other type and disposition of the actuator 21 in respect to the filter device 10 and the carriage 18 may be used or devised for the purpose of the present invention.

As shown in FIGS. 4 and 5, each pressure member 22 is in the form of an elongated self-locking detent member, angularly oriented in the forward moving direction of the carriage 18; each pressure member 22, near the front end and on the side facing the resting surface 23 is provided with a pressure edge 30 having a rounded shape to provide a contact surface with the filter band 14 having a short width to increase the pressure force against the filter band and the resting surface 23 to prevent slippage and assure a self-locking action of the same pressure member 22 when the filter band 14 reacts in the sense of arrow 15' in FIG. 1, to resist to the drawing force due to some resistance inside the filter device.

As shown in FIGS. 4 and 5, each pressure member 22 on the side opposite to the pressure edge 30, is provided with a pad member 31 of elastomeric material, to contact a stop 32 on the respective carriage 18, as shown in FIG. 4.

The working of the screen feeding device according to the invention, will be now explained with reference to FIGS. 1, 4 and 5.

Starting from FIGS. 1 and 4, in which the carriage 18 is in its retracted position near the filter device 10, when a filtering area of the filter band 14 in the flow-path of the filter device, is clogged and must be replaced by a clean one, both cylinders 21 are actuated to move the carriage 18 from the retracted position of FIG. 4 to the advanced position of FIG. 5.

In the position of FIG. 4 both pressure members 22 are in the backward position or disengaged from the filter band 14; therefore as soon as the cylinders 21 are actuated, firstly the forwards rotation of the pressure members 22 occurs towards the filter band 14, urging both edges of the same filter band 14 against the resting or supporting surface 23.

During the actuation of the cylinders 21, the locking action for the filter band 14 against the resting surface 23 is maintained by the pressure members 22; at the same time the carriage 18 is advanced towards the position of FIG. 5, drawing a prefixed length of the filter band 14 to remove the clogged area of the filter band 14, from the filter device substituting the same with a clean one.

As soon as the movement of the carriage 18 is revised by the control cylinders 21, firstly the pressure members 22 are backwards rotated to disengage the filter band 14, and to urge the pad member 31 against the stop 32, allowing the carriage to be returned to the retracted position of FIG. 4.

The operation of the feeding device may be then repeated at any new change of clogged area of the filter screen, as described above.

What we claim is:

1. Screen feeding device for a filter apparatus of the type comprising a flow-path for a flowable plastic material to be filtered by a screen in the form of a filter band transversely movable to the flow-path, and draw means for periodically advancing the filter band to substitute a clogged area with a clean one in said flow-path, the filter device comprising:

a carriage movable along guide members parallely extending on a side of the filter band;

surface means on the carriage for resting or supporting the filter band;

at least one rotatable pressure member fastened to a shaft on the carriage, for engaging and pressing the filter band against said surface means; and drive means operatively connected to the pressure member and to the carriage to sequentially rotate the same pressure member and to reciprocate the carriage for selectively engaging and disengaging the filter band and move the carriage along the guide members between a retracted and an advanced position, to draw the filter band across said flow-path.

2. Screen feeding device according to claim 1 wherein the pressure member is provided with a rounded edge to engage the filter band near the end facing said surface means.

3. Screen feeding device according to claim 1 wherein the pressure member is in the form of self-locking detent member angularly oriented in respect to said surface means.

4. Screen feeding device according to claim 3 wherein said pressure member is angularly oriented in the feeding direction of the filter band.

5. Screen feeding device according to claim 1 wherein said pressure member, on the side opposite to surface means, is provided with a pad to rest against a stop member on the carriage, to prevent the backwards rotation of the pressure member in a disengaged condition from the filter band.

6. Screen feeding device according to claim 1 wherein the carriage comprises integrally formed first and second side parts defining said surface means.

7. Screen feeding device according to claim 1 wherein the carriage comprises:

first and second parts laterally spaced apart, joined together to form a single carriage frame, each part of the carriage being slidably supported by respective guide rods, each of said carriage parts defining a filter-band resting surface on one side;

a pressure member rotatably supported by each of said first and second parts of the carriage in correspondence of said resting surface;

a control shaft mechanically connected to the pressure members, rotatably supported across said first and second carriage parts; and in that drive means are provided comprising first and second pressure actuated cylinders operatively connected by a respective crank lever to the control shaft of the pressure members, and to said first and second carriage parts.

* * * * *